United States Patent
Lin et al.

(10) Patent No.: US 9,860,133 B2
(45) Date of Patent: Jan. 2, 2018

(54) CONFIGURATION VALIDATION IN A MIXED NODE TOPOLOGY

(71) Applicant: Brocade Communications Systems, Inc., San Jose, CA (US)

(72) Inventors: Kwun-Nan Kevin Lin, Saratoga, CA (US); Shyamsunder Prayagchand Rathi, Sunnyvale, CA (US); Shafiuddin Mohammed, Fremont, CA (US); Ravi Swamy, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 15/051,601

(22) Filed: Feb. 23, 2016

(65) Prior Publication Data

US 2016/0173339 A1  Jun. 16, 2016

Related U.S. Application Data (63) Continuation of application No. 14/094,931, filed on Dec. 3, 2013, now Pat. No. 9,313,102.
(Continued)

(51) Int. Cl.
*H04L 12/26* (2006.01)
*H04L 12/24* (2006.01)

(52) U.S. Cl.
CPC .......... *H04L 41/12* (2013.01); *H04L 41/0873* (2013.01); *H04L 41/0866* (2013.01)

(58) Field of Classification Search
None
See application file for complete search history.

(56) References Cited

U.S. PATENT DOCUMENTS

| 4,625,308 A | 11/1986 | Kim et al. |
| 5,481,073 A | 1/1996 | Singer et al. |

(Continued)

FOREIGN PATENT DOCUMENTS

| CN | 1441580 A | 9/2003 |
| CN | 1791064 A | 6/2006 |

(Continued)

OTHER PUBLICATIONS

Amendment to Carrier Multiple Access with Collision Detection (CSMA/CD Access Method and Physical Layer Specifications—Aggregation of Multiple Link Segments; IEEE Std. 802.3ad; 2000; 183 pages.

(Continued)

*Primary Examiner* — Kwang B Yao
*Assistant Examiner* — Juvena Loo
(74) *Attorney, Agent, or Firm* — Fountainhead Law Group P.C.

(57) ABSTRACT

Techniques for validating configuration changes in a mixed node topology are provided. In one embodiment, a device can identify a link to be removed from a topology comprising a plurality of nodes, where the plurality of nodes includes one or more nodes of a first type and one or more nodes of a second type. The device can then determine whether the removal of the link from the topology would require data traffic between two nodes of the first type to pass through a node of the second type.

17 Claims, 6 Drawing Sheets

Related U.S. Application Data (60) Provisional application No. 61/825,451, filed on May 20, 2013.

(56) References Cited

U.S. PATENT DOCUMENTS

| | | | |
|---|---|---|---|
| 5,651,003 | A | 7/1997 | Pearce et al. |
| 5,727,170 | A | 3/1998 | Mitchell et al. |
| 6,111,672 | A | 8/2000 | Davis et al. |
| 6,243,756 | B1 | 6/2001 | Whitmire et al. |
| 6,366,582 | B1 | 4/2002 | Nishikado et al. |
| 6,373,840 | B1 | 4/2002 | Chen |
| 6,490,276 | B1 | 12/2002 | Salett et al. |
| 6,496,502 | B1 | 12/2002 | Fite, Jr. et al. |
| 6,516,345 | B1 | 2/2003 | Kracht |
| 6,526,345 | B2 | 2/2003 | Ryoo |
| 6,597,658 | B1* | 7/2003 | Simmons ............ H04L 41/0663 370/221 |
| 6,725,326 | B1 | 4/2004 | Patra et al. |
| 6,765,877 | B1 | 7/2004 | Foschiano et al. |
| 6,807,182 | B1 | 10/2004 | Dolphin et al. |
| 6,839,342 | B1 | 1/2005 | Parham et al. |
| 6,839,349 | B2 | 1/2005 | Ambe et al. |
| 6,850,542 | B2 | 2/2005 | Tzeng |
| 7,093,027 | B1 | 8/2006 | Shabtay et al. |
| 7,099,315 | B2 | 8/2006 | Ambe et al. |
| 7,106,736 | B2 | 9/2006 | Kalkunte |
| 7,136,289 | B2 | 11/2006 | Vasavda et al. |
| 7,184,441 | B1 | 2/2007 | Kadambi et al. |
| 7,206,283 | B2 | 4/2007 | Chang et al. |
| 7,206,309 | B2 | 4/2007 | Pegrum et al. |
| 7,274,694 | B1 | 9/2007 | Cheng et al. |
| 7,313,667 | B1 | 12/2007 | Pullela et al. |
| 7,327,727 | B2 | 2/2008 | Rich et al. |
| 7,336,622 | B1 | 2/2008 | Fallis et al. |
| 7,426,179 | B1 | 9/2008 | Harshavardhana et al. |
| 7,480,258 | B1 | 1/2009 | Shuen et al. |
| 7,496,096 | B1 | 2/2009 | Dong et al. |
| 7,523,227 | B1 | 4/2009 | Yager et al. |
| 7,561,527 | B1 | 7/2009 | Katz et al. |
| 7,565,343 | B1 | 7/2009 | Watanabe |
| 7,602,787 | B2 | 10/2009 | Cheriton |
| 7,697,419 | B1 | 4/2010 | Donthi |
| 7,933,282 | B1 | 4/2011 | Gupta et al. |
| 7,962,595 | B1* | 6/2011 | Jabbar .................. H04L 41/12 370/254 |
| 8,209,457 | B2 | 6/2012 | Engel et al. |
| 8,307,153 | B2 | 11/2012 | Kishore |
| 8,750,144 | B1 | 6/2014 | Zhou et al. |
| 8,949,574 | B2 | 2/2015 | Slavin |
| 9,032,057 | B2 | 5/2015 | Agarwal et al. |
| 9,038,151 | B1 | 5/2015 | Chua et al. |
| 9,148,387 | B2 | 9/2015 | Lin et al. |
| 9,185,049 | B2 | 11/2015 | Agarwal et al. |
| 9,269,439 | B1 | 2/2016 | Levy et al. |
| 9,282,058 | B2 | 3/2016 | Lin et al. |
| 9,313,102 | B2 | 4/2016 | Lin et al. |
| 9,559,897 | B2 | 1/2017 | Lin et al. |
| 9,577,932 | B2 | 2/2017 | Ravipati et al. |
| 9,628,408 | B2 | 4/2017 | Janardhanan et al. |
| 9,660,937 | B2 | 5/2017 | Agarwal et al. |
| 9,692,652 | B2 | 6/2017 | Lin et al. |
| 9,692,695 | B2 | 6/2017 | Lin et al. |
| 2001/0042062 | A1* | 11/2001 | Tenev ................ G06F 17/30958 |
| 2002/0046271 | A1 | 4/2002 | Huang |
| 2002/0101867 | A1 | 8/2002 | O'Callaghan et al. |
| 2003/0005149 | A1* | 1/2003 | Haas ................... H04L 12/1854 709/238 |
| 2003/0081556 | A1 | 5/2003 | Woodall |
| 2003/0137983 | A1* | 7/2003 | Song .................. H04L 12/5695 370/395.4 |
| 2003/0169734 | A1 | 9/2003 | Lu et al. |
| 2003/0174719 | A1 | 9/2003 | Sampath et al. |
| 2003/0182483 | A1 | 9/2003 | Hawkins |
| 2003/0188065 | A1 | 10/2003 | Golla et al. |
| 2005/0063354 | A1 | 3/2005 | Garnett et al. |
| 2005/0141513 | A1 | 6/2005 | Oh et al. |
| 2005/0198453 | A1 | 9/2005 | Osaki |
| 2005/0243739 | A1 | 11/2005 | Anderson et al. |
| 2005/0271044 | A1 | 12/2005 | Hsu et al. |
| 2006/0013212 | A1 | 1/2006 | Singh et al. |
| 2006/0023640 | A1 | 2/2006 | Chang et al. |
| 2006/0072571 | A1 | 4/2006 | Navada et al. |
| 2006/0077910 | A1 | 4/2006 | Lundin et al. |
| 2006/0080498 | A1 | 4/2006 | Shoham et al. |
| 2006/0092849 | A1 | 5/2006 | Santoso et al. |
| 2006/0092853 | A1 | 5/2006 | Santoso et al. |
| 2006/0114899 | A1 | 6/2006 | Toumura et al. |
| 2006/0176721 | A1 | 8/2006 | Kim et al. |
| 2006/0187900 | A1 | 8/2006 | Akbar |
| 2006/0253557 | A1 | 11/2006 | Talayco et al. |
| 2006/0280125 | A1 | 12/2006 | Ramanan et al. |
| 2006/0294297 | A1 | 12/2006 | Gupta |
| 2007/0081463 | A1 | 4/2007 | Bohra et al. |
| 2007/0121673 | A1 | 5/2007 | Hammer |
| 2007/0147271 | A1* | 6/2007 | Nandy ................ H04L 41/0896 370/254 |
| 2007/0174537 | A1 | 7/2007 | Kao et al. |
| 2007/0291660 | A1* | 12/2007 | Robson ................ H04W 24/00 370/252 |
| 2008/0137530 | A1 | 6/2008 | Fallis et al. |
| 2008/0192754 | A1 | 8/2008 | Ku et al. |
| 2008/0212497 | A1* | 9/2008 | Getachew ........... H04W 76/028 370/256 |
| 2008/0259555 | A1 | 10/2008 | Bechtolsheim et al. |
| 2008/0275975 | A1 | 11/2008 | Pandey et al. |
| 2008/0281947 | A1 | 11/2008 | Kumar |
| 2009/0125617 | A1 | 5/2009 | Klessig et al. |
| 2009/0135715 | A1 | 5/2009 | Bennah |
| 2009/0141641 | A1 | 6/2009 | Akahane et al. |
| 2010/0172365 | A1 | 7/2010 | Baird et al. |
| 2010/0182933 | A1 | 7/2010 | Hu et al. |
| 2010/0185893 | A1 | 7/2010 | Wang et al. |
| 2010/0257283 | A1 | 10/2010 | Agarwal |
| 2010/0284414 | A1 | 11/2010 | Agarwal et al. |
| 2010/0293200 | A1 | 11/2010 | Assarpour |
| 2010/0329111 | A1 | 12/2010 | Wan et al. |
| 2011/0092202 | A1* | 4/2011 | Mattisson ........... H04L 12/2697 455/425 |
| 2011/0142077 | A1* | 6/2011 | Wong .................... H04J 3/0679 370/503 |
| 2011/0238923 | A1 | 9/2011 | Hooker et al. |
| 2011/0268123 | A1 | 11/2011 | Kopelman et al. |
| 2011/0280258 | A1 | 11/2011 | Klingen |
| 2012/0020373 | A1 | 1/2012 | Subramanian et al. |
| 2012/0087232 | A1 | 4/2012 | Hanabe et al. |
| 2012/0131123 | A1 | 5/2012 | Yan |
| 2012/0155485 | A1 | 6/2012 | Saha et al. |
| 2012/0246400 | A1 | 9/2012 | Bhadra et al. |
| 2013/0170495 | A1 | 7/2013 | Suzuki et al. |
| 2013/0201984 | A1 | 8/2013 | Wang |
| 2013/0215791 | A1 | 8/2013 | Lin et al. |
| 2013/0232193 | A1 | 9/2013 | Ali et al. |
| 2013/0262377 | A1 | 10/2013 | Agarwal et al. |
| 2014/0003228 | A1 | 1/2014 | Shah et al. |
| 2014/0006706 | A1 | 1/2014 | Wang |
| 2014/0071985 | A1 | 3/2014 | Kompella et al. |
| 2014/0075108 | A1 | 3/2014 | Dong et al. |
| 2014/0112190 | A1 | 4/2014 | Chou et al. |
| 2014/0112192 | A1 | 4/2014 | Chou et al. |
| 2014/0122791 | A1 | 5/2014 | Fingerhut |
| 2014/0126354 | A1 | 5/2014 | Hui et al. |
| 2014/0153573 | A1 | 6/2014 | Ramesh et al. |
| 2014/0181275 | A1 | 6/2014 | Lin et al. |
| 2014/0269402 | A1* | 9/2014 | Vasseur ............... H04L 45/302 370/253 |
| 2014/0314082 | A1 | 10/2014 | Korpinen et al. |
| 2014/0334494 | A1 | 11/2014 | Lin et al. |
| 2014/0341079 | A1 | 11/2014 | Lin et al. |
| 2014/0341080 | A1 | 11/2014 | Lin et al. |
| 2014/0376361 | A1 | 12/2014 | Hui et al. |
| 2015/0016277 | A1 | 1/2015 | Smith et al. |
| 2015/0036479 | A1 | 2/2015 | Gopalarathnam |
| 2015/0055452 | A1 | 2/2015 | Lee |

(56) References Cited

U.S. PATENT DOCUMENTS

| | | | |
|---|---|---|---|
| 2015/0117263 | A1 | 4/2015 | Agarwal et al. |
| 2015/0124826 | A1 | 5/2015 | Edsall et al. |
| 2015/0229565 | A1 | 8/2015 | Ravipati et al. |
| 2015/0271861 | A1 | 9/2015 | Li |
| 2015/0281055 | A1 | 10/2015 | Lin et al. |
| 2015/0288567 | A1 | 10/2015 | Lin et al. |
| 2016/0021697 | A1 | 1/2016 | Vargantwar et al. |
| 2016/0028652 | A1 | 1/2016 | Agarwal et al. |
| 2016/0173332 | A1 | 6/2016 | Agarwal et al. |
| 2016/0173339 | A1 | 6/2016 | Lin et al. |

FOREIGN PATENT DOCUMENTS

| | | |
|---|---|---|
| CN | 101478435 A | 7/2009 |
| CN | 102684999 A | 9/2012 |
| EP | 2924927 A1 | 9/2015 |
| WO | 2015026950 | 2/2015 |

OTHER PUBLICATIONS

Appeal Brief Dated Jan. 18, 2013; U.S. Appl. No. 12/463,964 (23p.).
Brocade: "FastIron Ethernet Switch"; Administration Guide; Supporting FastIron Software Release 08.0.00; Apr. 30, 2013; 400 pages.
Brocade: "FastIron Ethernet Switch"; IP Multicast Configuration Guide; Supporting FastIron Software Release 08.0.00; Apr. 30, 2013; 212 pages.
Brocade: "FastIron Ethernet Switch"; Stacking Configuration Guide; Supporting FastIron Software Release 08.0.00; Apr. 30, 2013; 170 pages.
Brocade: "FastIron Ethernet Switch"; Traffic Management Guide; Supporting FastIron Software Release 08.0.00; Apr. 30, 2013; 76 pages.
Cisco: "Cisco StackWise and StackWise Plus Technology"; technical white paper; C11-377239-01; Oct. 2010; Copyright 2010; 11 pages.
Cisco: "Delivering High Availability in the Wiring Closet with Cisco Catalyst Switches"; technical white paper; C11-340384-01; Jan. 2007; Copyright 1992-2007; 8 pages.
Configure, Verify, and Debug Link Aggregation Control Program (LACP); allied Telesyn; 2004; 10 pages.
Dell: "Stacking Dell PowerConnect 7000 Series Switches"; A Dell Technical White Paper; Jul. 2011; 34 pages.
DLDP Techology White Paper; H3C products and solutions; 2008; 8 pages; http://www.h3c.com/portal/Products_Solutions/Technology/LAN/technology_White_Paper/200812/623012_57_0.htm.
Examiner's Answer dated May 7, 2013; U.S. Application No. 12/463,964 (12 p.).
Extreme Networks Technical Brief: "SummitStack Stacking Technology"; 1346_06; Dec. 2010; 8 pages.
Final Office Action dated Jan. 23, 2012; U.S. Appl. No. 12/463,964 (11 p.).
Fischer et al.: "A Scalable ATM Switching System Architecture"; IEEE Journal on Selected Areas in Communications, IEEE Service Center, Piscataway, US, vol. 9, No. 8, Oct. 1, 1991; pp. 1299-1307.
International Search Report and Written Opinion for International Appln. No. PCT/US2013/076251 dated May 22, 2014, 11 pages.
Juniper Networks datasheet entitled: "Juniper Networks EX 4200 Ethernet Switches with Virtual Chassis Technology"; Dated Aug. 2013 (12 p.).
Link Aggregation According to IEEE Standard 802.3ad; SysKonnect GmbH; 2002; 22 pages.
Link Aggregation; http://en.wikipedia.org/wiki/Link_aggregation; downloaded from Internet on Dec. 16, 2013; 9 pages.
M. Foschiano; Cisco Systems UniDirectional Link Detection (UDLD) Protocol; Memo; Apr. 2008; 13 pages; Cisco Systems.
Migration from Cisco UDLD to industry standard DLDP; technical white paper; Feb. 2012; 12 pages; Hewlett-Packard Development Company.
Office Action dated Mar. 21, 2011; U.S. Appl. No. 12/463,964 (10 P.).
Partial International Search Report for PCT/US2014/051903 dated Nov. 18, 2014.
Reply Brief dated Jul. 8, 2013; U.S. Appl. No. 121463,964 (14 p.).
Response to Office Action dated Mar. 21, 2011; U.S. Appl. No. 12/463,964; Response filed Sep. 21, 2011 (12 p.).
Suckfuell: "Evolution of EWSD During the Eighties"; Institute of Electrical and Electronics Engineers; Global Telecommunications Conference; San Diego; Nov. 28-Dec. 1, 1983; [Global Telecommunications Conference], New York, IEEE, US, vol. 2, Nov. 1, 1983; pp. 577-581.
U.S. Appl. No. 14/094,931, filed Dec. 3, 2013 by Lin et al.
U.S. Appl. No. 14/106,302, filed Dec. 13, 2013 by Lin et al.
U.S. Appl. No. 14/171,152, filed Feb. 3, 2014 by Lin et al.
U.S. Appl. No. 14/207,146, filed Mar. 12, 2014 by Lin et al.
U.S. Appl. No. 14/268,507, filed May 2, 2014 by Agarwal. (Unpublished).
U.S. Appl. No. 14/463,419, filed Aug. 19, 2014 by Lee. (Unpublished).
U.S. Appl. No. 14/485,343, filed Sep. 12, 2014 by Lin et al. (Unpublished).
U.S. Appl. No. 14/506,943, filed Oct. 6, 2014 by Lin et al. (Unpublished).
U.S. Appl. No. 14/530,193, filed Oct. 31, 2014 by Ravipati et al. (Unpublished).
U.S. Appl. No. 61/745,396, filed Dec. 21, 2012 by Lin et al.
U.S. Appl. No. 61/799,093, filed Mar. 15, 2013 by Lin et al.
U.S. Appl. No. 61/822,216, filed May 10, 2013 by Lin et al.
U.S. Appl. No. 61/825,449, filed May 20, 2013 by Lin et al.
U.S. Appl. No. 61/825,451, filed May 20, 2013 by Lin et al.
U.S. Appl. No. 61/868,982, filed Aug. 22, 2013 by Lee.
U.S. Appl. No. 61/898,295, filed Oct. 31, 2013 by Agarwal.
U.S. Appl. No. 61/938,805, filed Feb. 12, 2014 by Ravipati et al.
U.S. Appl. No. 61/971,429, filed Mar. 27, 2014 by Sinha et al.
U.S. Appl. No. 61/974,924, filed Apr. 3, 2014 by Lin et al.
Understanding and Configuring the Undirectional Link Detection Protocol Feature; Cisco support communication; Jul. 9, 2007; Document ID No. 10591; 5 pages; http://www.cisco.comic/en/us/support/docs/lan-switching/spanning-tree-protocol/10591-77.html.
International Search Report and Written Opinion for International Appln. No. PCT/US2014/051903 dated Jan. 27, 2015, 16 pages.
Final Office Action dated Feb. 13, 2015; U.S. Appl. No. 13/850,118; (14 p.).
Office Action dated Jul. 16, 2015; U.S. Appl. No. 14/094,931; (41 pgs.).
Notice of Allowance dated Aug. 3, 2015; U.S. Appl. No. 14/207,146 (38 pgs.).
Pei et al.: "Putting Routing Tables in Silicon", IEEE Network, IEEE Service Center, New York, NY; vol. 6, No. 1, Jan. 1, 1992; pp. 42-50.
Hsiao et al.: "A High-Throughput and High-Capacity IPv6 Routing Lookup System", Computer Networks, Elsevier Science Publishers B.V., Amsterdam, NL, vol. 57, No. 3, Nov. 16, 2012, pp. 782-794.
Extended European Search Report dated Jul. 30, 2015 for EP Appln. 15000834.0; 8 pages.
Notice of Allowance dated Sep. 17, 2015; U.S. Appl. No. 14/268,507 (15 pgs.).
U.S. Appl. No. 14/876,639, filed Oct. 6, 2015 by Agarwal et al.
Notice of Allowance dated Oct. 30, 2015; U.S. Appl. No. 13/850,118 (12 pgs.).
Response to Office Action dated Jul. 16, 2015; U.S. Appl. No. 14/094,931; Response filed Nov. 12, 2015 (13 p.).
Office Action dated Nov. 20, 2015; U.S. Appl. No. 14/106,302; (14 pgs)
Notice of Allowance dated Dec. 14, 2015; U.S. Appl. No. 14/094,931 (25 pgs.).
U.S. Appl. No. 62/092,617, filed Dec. 16, 2014 by Agarwal et al.
Office Action dated Feb. 18, 2016; U.S. Appl. No. 14/463,419; (74 pgs.).

(56) References Cited

OTHER PUBLICATIONS

Office Action dated Feb. 23, 2016; U.S. Appl. No. 14/171,152; (61 pgs.)
U.S. Appl. No. 14/869,743, filed Sep. 29, 2015 by Agarwal et al.
Office Action dated Apr. 29, 2016; U.S. Appl. No. 14/485,343; (72 pgs.)
Final Office Action dated Jun. 3, 2016; U.S. Appl. No. 14/106,302; (35 pgs.).
Rooney et al.: "Associative Ternary Cache for IP Routing", IEEE, pp. 409-416, 2004.
"Starburst: Building Next-Generation Internet Devices", Sharp et al., Bell Labs Technical Journal, Lucent Technologies, Inc., pp. 6-17, 2002.
NonFinal Office Action dated Jun. 23, 2016; U.S. Appl. No. 14/530,193; (73 pgs.).
NonFinal Office Action dated Jul. 13, 2016; U.S. Appl. No. 14/876,639; (69 pgs.).
Notice of Allowance dated Jan. 6, 2017; U.S. Appl. No. 14/530,193; (18 pgs.).
Notice of Allowance dated Feb. 8, 2017; U.S. Appl. No. 14/876,639; (25 pgs.).
Final Office Action dated Jan. 26, 2017; U.S. Appl. No. 14/463,419; (57 pgs.).
Final Office Action dated Aug. 24, 2016; U.S. Appl. No. 14/171,152; (39 pgs.).
Notice of Allowance dated Oct. 13, 2016; U.S. Appl. No. 14/106,302; (23 pgs.).
Final Office Action dated Nov. 1, 2016; U.S. Appl. No. 14/485,343; (31 pgs.).
NonFinal Office Action dated Nov. 9, 2016; U.S. Appl. No. 14/506,943; (18 pgs.).
NonFinal Office Action dated Jun. 15, 2017; U.S. Appl. No. 14/463,419; (35 pgs.).
29—Chinese Office Action dated Jul. 24, 2017 Appln. No. 201510142392.X; 8 pages.
30—Pei et al.: Putting Routing Tables in Silicon, IEEE Network Magazine, Jan. 31, 1992, 9 pages.
31—Qingsheng et al.: Designing of Packet Processing Chip Routers, Aug. 31, 2001, China Academic Journal Electronic Publishing House, 4 pages. (No English version).
32—Hsiao et al.: A High-Throughput and High-Capacity IPv6 Routing Lookup System, Nov. 16, 2012, Computer Networks, 13, pages.
NonFinal Office Action dated Mar. 23, 2017; U.S. Appl. No. 14/171,152; (14 pgs.).
Notice of Allowance dated Mar. 22, 2017; U.S. Appl. No. 14/506,943; (22 pgs.).
Notice of Allowance dated Apr. 13, 2017; U.S. Appl. No. 14/485,343; (25 pgs.).
Chinese Office Action dated May 16, 2017 Appln. No. 201380065745.X.
Notice of Allowance dated Sep. 13, 2017; U.S. Appl. No. 14/171,152; (30 pgs.)
NonFinal Office Action dated Oct. 26, 2017; U.S. Appl. No. 14/869,743; (70 pgs).

\* cited by examiner

CONFIGURATION VALIDATION IN A MIXED NODE TOPOLOGY

CROSS REFERENCES TO RELATED APPLICATIONS

The present application is a continuation of U.S. application Ser. No. 14/094,931, filed Dec. 3, 2013, now U.S. Pat. No. 9,313,102, issued Apr. 12, 2016, entitled "CONFIGURATION VALIDATION IN A MIXED NODE TOPOLOGY," which claims the benefit and priority under 35 U.S.C. 119(e) of U.S. Provisional Application No. 61/825,451, filed May 20, 2013, entitled "FAILSAFE CONFIGURATION VERIFICATION IN A STACKING SYSTEM." The entire contents of these applications are incorporated herein by reference for all purposes.

BACKGROUND

Figure 1A:
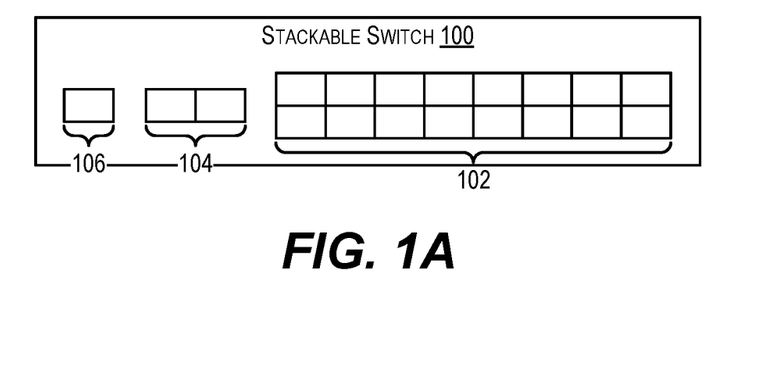
FIG. 1A depicts a stackable switch according to an embodiment.

As known in the art, a "stackable switch" is a network switch that can operate independently as a standalone device or in concert with one or more other stackable switches in a "stack" or "stacking system." FIG. 1A illustrates the front face of an exemplary stackable switch 100 according to an embodiment. As shown, stackable switch 100 includes a set of data ports 102, a set of stacking ports 104, and a console port 106. Data ports 102 are operable for connecting stackable switch 100 to one or more hosts and/or data networks. Stacking ports 104 are operable for linking stackable switch 100 to other stackable switches in the same stacking system/topology. Stacking ports 104 can be dedicated ports (i.e., ports designed specifically for stacking) or high bandwidth data uplink ports that operate in a stacking mode. Finally, console port 106 is operable for accessing the management console of stackable switch 100 in order to perform various device management functions.

Figure 1B:
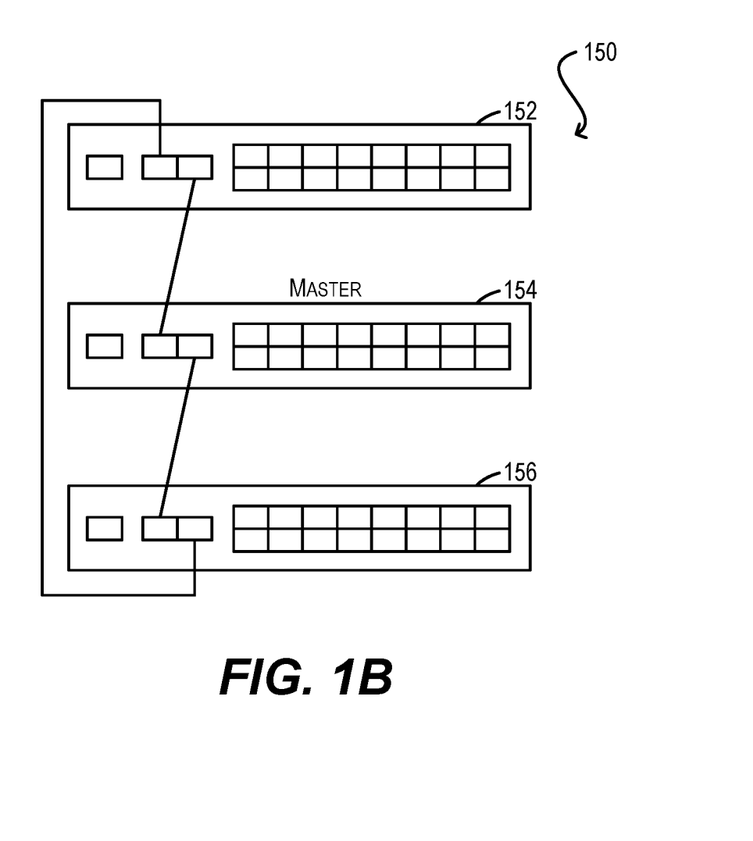
FIG. 1B depicts a stacking system according to an embodiment.

FIG. 1B illustrates an exemplary stacking system 150 according to an embodiment. As shown, stacking system 150 comprises a number of stackable switches 152, 154, and 156 (each similar to stackable switch 100 of FIG. 1A) that have been linked together via their respective stacking ports. In the example of FIG. 1B, stackable switches 152, 154, and 156 form a ring topology. In addition, stackable switch 154 is designated as the "master" unit of stacking system 150, which means that switch 154 serves as the point of user contact for all management functions of system 150. For instance, stackable switch 154 can accept and process user commands directed to the overall configuration of stacking system 150. Stackable switch 154 can also communicate with non-master units 152 and 156 on an as-needed basis in order to propagate various types of management commands and data to those units.

Generally speaking, prior art stacking systems are limited to relatively simple topologies like the ring topology depicted in FIG. 1B. However, new stacking technologies, such as Brocade Communications Systems' "HyperEdge" technology, support more complex topologies (e.g., arbitrary meshes). These complex topologies are beneficial because they can provide better performance (through reduced switch-to-switch latency) and superior resiliency (via redundant stacking paths). In addition, HyperEdge supports a feature known as "mixed" stacking, which allows high-end stackable switches (i.e., switches with more features, ports, and/or bandwidth) to be combined with low-end stackable switches (i.e., switches with fewer features, ports, and/or bandwidth) in a single stacking system. This mixing of high-end and low-end units can increase the scalability and cost effectiveness of the system.

Figure 2A:
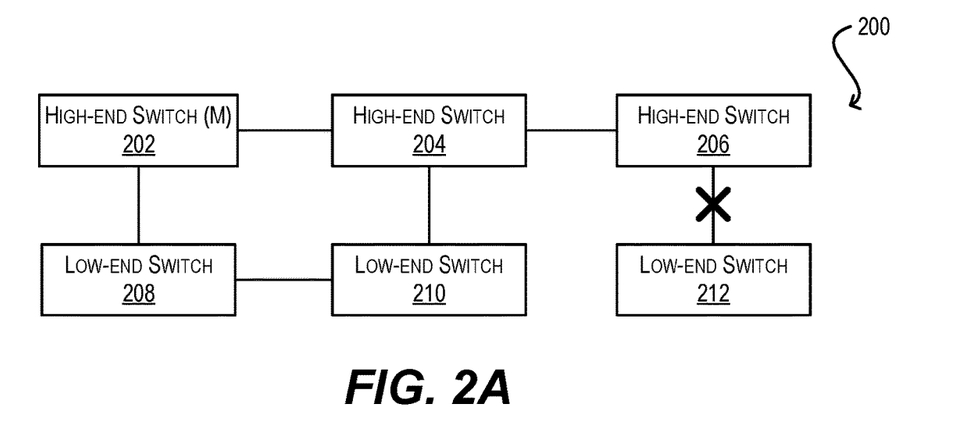
FIG. 2A depicts a scenario where the removal of a stacking link results in an unreachable unit.

Unfortunately, while complex topology support and mixed stacking have clear benefits for users, they can also complicate stacking system administration and management, particularly in instances where an administrator wishes to make topology configuration changes. For example, consider stacking system 200 depicted in FIGS. 2A and 2B, which comprises three high-end switches 202, 204, 206 and three low-end switches 208, 210, 212 that are interconnected via a mesh-like topology. High-end switch 202 is the master unit in this configuration. Assume that an administrator attempts to remove the stacking link between high-end switch 206 and low-end switch 212 from the system's topology configuration as shown in FIG. 2A. In this scenario, the removal of the stacking link will cause low-end switch 212 to be unreachable by the master unit (i.e., high-end switch 202), and thus will break the system (since switch 202 can no longer communicate management commands/data to switch 212).

Figure 2B:
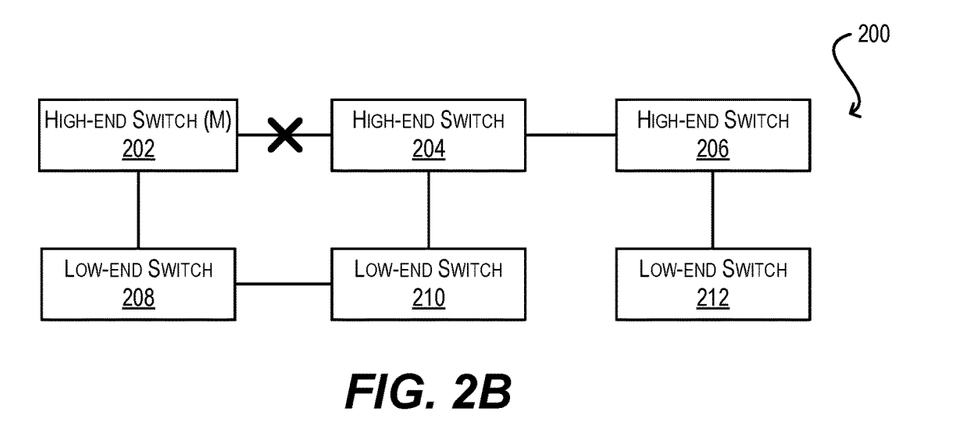
FIG. 2B depicts a scenario where the removal of a stacking link causes traffic between two high-end units to flow through a low-end unit.

As another example, assume that the administrator attempts to remove the stacking link between high-end switches 202 and 204 from the system's topology configuration as shown in FIG. 2B. In this scenario, the removal of the stacking link will force traffic between high-end switches 202 and 204 to flow though low-end switches 208 and 210. This, in turn, can result in congestion and reduced system performance, since low-end switches will typically have less bandwidth capacity on their stacking ports than high-end switches (e.g., 10 GB/port on low-end switches vs. 40 GB/port on high-end switches).

SUMMARY

Techniques for validating configuration changes in a mixed node topology are provided. In one embodiment, a device can identify a link to be removed from a topology comprising a plurality of nodes, where the plurality of nodes includes one or more nodes of a first type and one or more nodes of a second type. The device can then determine whether the removal of the link from the topology would require data traffic between two nodes of the first type to pass through a node of the second type.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for automatically validating configuration changes in a mixed node topology. As used herein, a "mixed node topology" refers to a set of interconnected nodes, where the set includes at least two different node types, and where some of the node types are more "capable" than others (e.g., may support greater bandwidth, a larger number of ports, a higher level of security clearance, etc.). In addition, the set of interconnected nodes includes a master node of the most capable node type. In one set of embodiments, a particular node in the topology (e.g., the master node) can identify a link to be removed from the topology. For example, the master node can receive a user command to remove the link (or a port/trunk associated with the link). The master node can then execute a validation algorithm to ensure that the removal of the link will not cause (1) any node to become unreachable by the master node, and (2) traffic between two nodes to flow through a node that is less capable than either of the two nodes. If the algorithm returns a successful result (indicating that the removal of the link will not cause (1) and/or (2)), the master node can allow the link removal to occur. On the other hand, if the algorithm returns an unsuccessful result (indicating that the removal of the link will cause (1) or (2)), the master node can prevent the link from being removed from the topology.

In certain embodiments, the validation algorithm noted above can be particularly useful when applied to stacking systems that use mixed stacking in combination with complex (e.g., mesh-like) topologies. For example, the algorithm can avoid the problematic scenarios described with respect to stacking system 200 of FIGS. 2A and 2B. However, it should be appreciated that embodiments of the present invention are not limited to stacking systems, and may be used to validate link removal in any arbitrary mixed node topology (e.g., general L2/L3 networks or fabrics).

Figure 3:
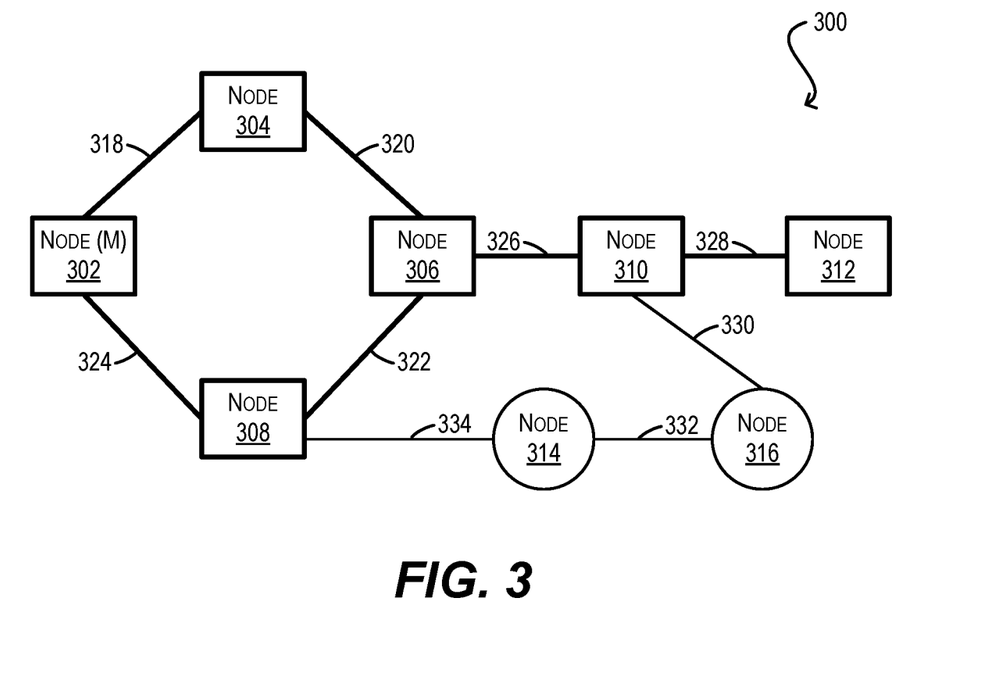
FIG. 3 depicts a mixed node topology according to an embodiment.

FIG. 3 depicts an example of a mixed node topology (300) according to an embodiment. As shown, topology 300 includes a set of nodes of a first type (i.e., 302, 304, 306, 308, 310, 312) that are identified by a heavy outline, and a set of nodes of a second type (i.e., 314, 316) that are identified by a lighter outline. Node 302 is designated a master node, and thus is responsible for facilitating the configuration and management of topology 300.

In the example of FIG. 3, the nodes of the first type are "high-end" nodes (e.g., high-end stackable switches), while the nodes of the second type are "low-end" nodes (e.g., low-end stackable switches). Accordingly, high-end nodes 302, 304, 306, 308, 310, 312 have more and/or superior capabilities than low-end nodes 314, 316. For example, in a particular embodiment, high-end nodes 302, 304, 306, 308, 310, 312 can have higher bandwidth communication ports than low-end nodes 314, 316. This means that the links directly interconnecting the high-end nodes (i.e., 318, 320, 322, 324, 326, 328) can support a greater data throughout than the links interconnecting the low-end nodes with each other (or with the high-end nodes) (i.e., 330, 332, 334). In alternative embodiments, high-end nodes 302, 304, 306, 308, 310, 312 can have other characteristics that distinguish these nodes from low-end nodes 314, 316 (e.g., a larger number of ports, more advanced network processing capabilities, a higher level of security clearance, etc.).

As discussed in the Background section, there are at least two potential issues that may arise when removing links from a complex, mixed-node topology such as topology 300 of FIG. 3. First, the removal of a link may cause one or more nodes to be inadvertently "severed" from (i.e., rendered unreachable by) master node 302, thereby preventing master node 302 from communicating management commands and/or data to the severed nodes. Second, the removal of a link may cause traffic between two or more high-end nodes (e.g., 302, 304, 306, 308, 310, 312) to traverse through a low-end node (e.g., 314, 316). Since, in the example of FIG. 3, the links between high-end nodes and low-end nodes have a lower bandwidth capacity than the links directly interconnecting high-end nodes, this situation can undesirably lead to congestion and reduced system performance.

To address these (and other similar) issues, in various embodiments master node 302 can execute a validation algorithm at the time a link removal is to occur within topology 300 (e.g., at the time an administrator or other agent submits a "remove link" or "remove port" command). In one embodiment, the validation algorithm can check whether the removal of the link will result in any unreachable nodes. In a further embodiment, the validation algorithm can check whether the removal of the link will cause traffic between any two nodes to flow though a less capable node. If the algorithm determines that either of these scenarios will occur, master node 302 can block the link removal from proceeding. In this way, the undesirable consequences associated with these scenarios can be automatically avoided, without any manual intervention by a user or administrator.

It should be noted that this validation algorithm can be applied any arbitrary topology (e.g., ring, linear, mesh, etc.), and is not limited to specific types of topologies. Thus the same algorithm may be used across a variety of different deployments, each having different topological requirements/characteristics. In addition, although topology 300 depicts only two node types for purposes of illustration (i.e., a high-end node type and low-end node type), the validation algorithm may be applied to topologies that have more than two different node types (where each node type has a corresponding "capability" level). In these embodiments, the algorithm can ensure that traffic between any two nodes in the topology (of the same or different node types) will not pass through a node of a less capable type than either of the two nodes.

Figure 4:
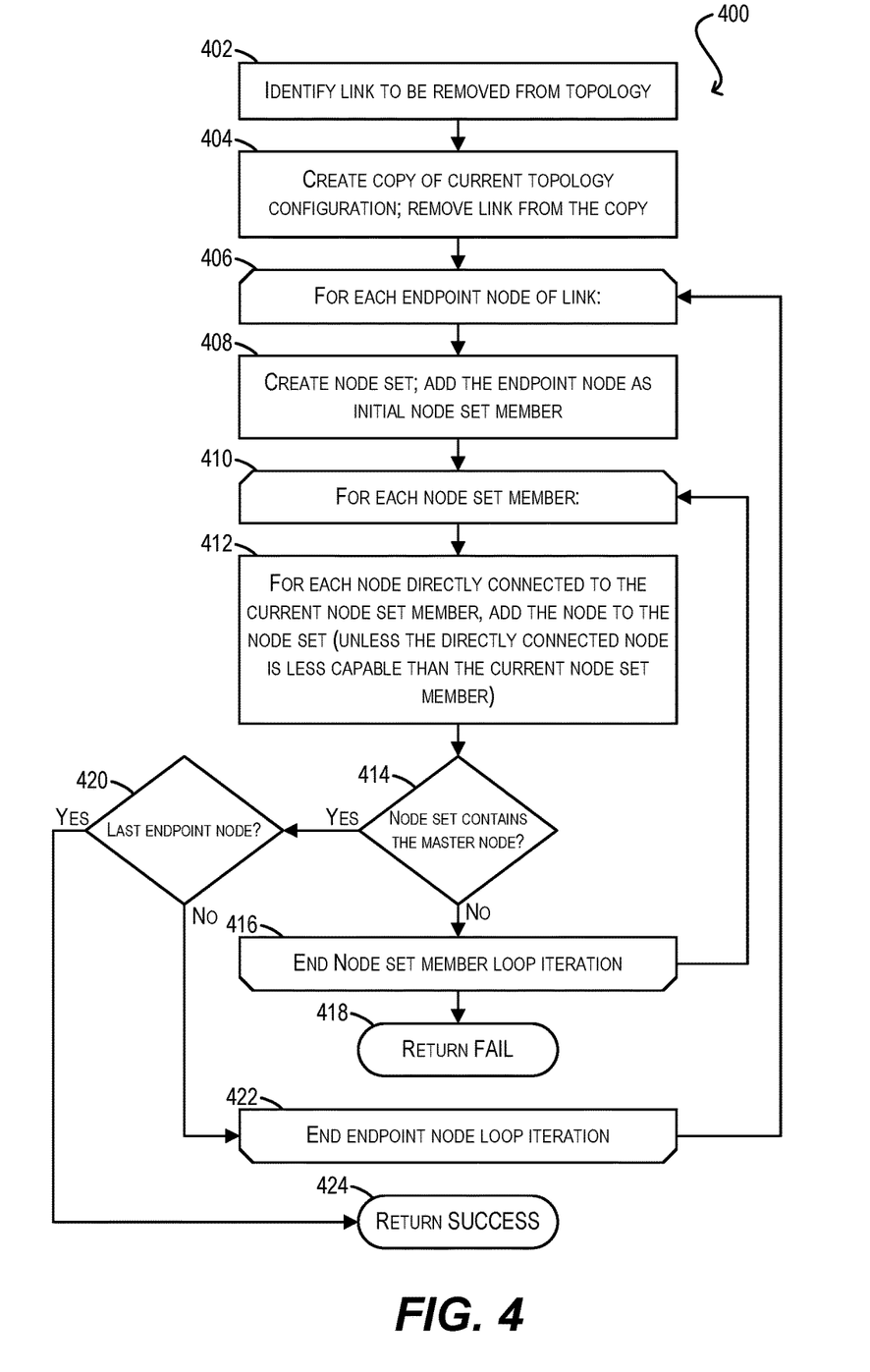
FIG. 4 depicts an algorithm for validating the removal of a link in a mixed node topology according to an embodiment.

FIG. 4 depicts a flowchart 400 that can be performed by master node 302 of FIG. 3 for carrying out the validation algorithm described above according to an embodiment. Flowchart 400 assumes that master node 302 has access to the current configuration of topology 300.

At block 402, master node 302 can identify a link to be removed from topology 300. For example, in embodiments where topology 300 is a stacking system, master node 302 can receive a user command to remove a particular stacking port or trunk from a stackable switch in the system. Master node 302 can then identify the link to be removed based on the specified port/trunk ID.

At block 404, master node 302 can create a copy of the current topology configuration and remove the link from the copy. Master node 302 can subsequently enter a loop for each endpoint of the link (block 406).

Within the loop of block 406, master node 302 can first create a "node set" and add the current endpoint node as the node set's initial member (block 408). Upon creating the node set, master node 302 can enter a second loop for each node set member (block 410).

Within the second loop of block 410, master node 302 can, for each node directly connected to the current node set member in the copy of the topology configuration, add the node to the node set (block 412). If the node is already part of the node set, it is not added again. In a particular embodiment, as part of the processing of block 412, master node 302 can enforce a restriction where a directly connected node is not added to the node set if the directly connected node is less capable than the current node set member (e.g., the directly connected node is a low-end node and the current node set member is a high-end node). In the context of topology 300 of FIG. 3, this restriction effectively prevents the algorithm from considering paths through topology 300 that flow from a high-end node though a low-end node and back to a high-end node.

Once all of the directly connected nodes for the current node set member have been processed (and added to the node set if appropriate), master node 302 can check whether the node set now includes itself (i.e., the master node) (block 414). In other words, master node 302 can check whether a path has been established from the endpoint node to the master node. If not, the current iteration of loop 410 can end (block 416) and master node 302 can repeat loop 410 in order to recursively process additional members in the node set (including new members added at block 412). If all of members in the node set are processed and the node set still does not include the master node, master node 302 can conclude that there is no viable path from the endpoint node to the master node and can return a "FAIL" result (indicating that the link removal should not be allowed) (block 418).

On the other hand, if the node set does include the master node at some point during loop 410, master node 302 can check whether the current endpoint node (within loop 406) is the last (i.e., second) endpoint node to be processed. If so, master node 302 can conclude there are viable paths between each endpoint node of the removed link and the master node, and can return a "SUCCESS" result (indicating that the link removal should be allowed) (block 424). Otherwise, the current iteration of loop 406 can end (block 422) and master node 302 can repeat loop 406 in order to process the second endpoint node of the removed link. This second iteration of loop 406 will ultimately result in a "FAIL" result per block 418 or a "SUCCESS" result per block 424.

It should be appreciated that the validation algorithm of FIG. 4 is illustrative and various modifications are possible. For example, after identifying the link to be removed at block 402, in certain embodiments master node 302 can first check whether the link is "live" (i.e., physically connected). Master node 302 can determine this by, e.g., referencing an internal representation of the physical topology, or running a topology discovery algorithm. If the link is not live, master node 302 can return a "SUCCESS" result (i.e., allow the link removal to proceed), without continuing with the rest of the algorithm.

In further embodiments, rather than being performed solely by master node 302, portions of flowchart 400 can be performed by other nodes or devices in topology 300. For instance, in a particular embodiment, each endpoint node of the removed link can perform a slightly modified version of blocks 408-424 that returns either a "SUCCESS" result (if the master node is added to the node set for the endpoint node) or a "FAIL" result (if the master node is never added to the node set for the endpoint node). Each endpoint node can then transmit its result to master node 302, which can allow the link removal if both endpoint nodes return "SUCCESS" or block the link removal if either endpoint node returns "FAIL." One of ordinary skill in the art will recognize many variations, modifications, and alternatives.

Figure 5A:
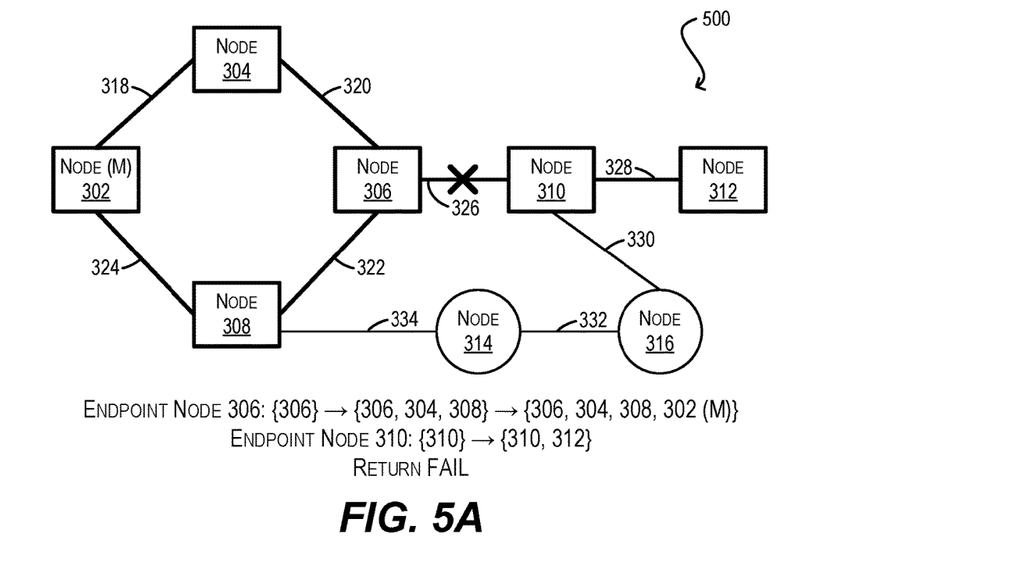
FIGS. 5A and 5B depict example applications of the algorithm of FIG. 3.
Figure 5B:
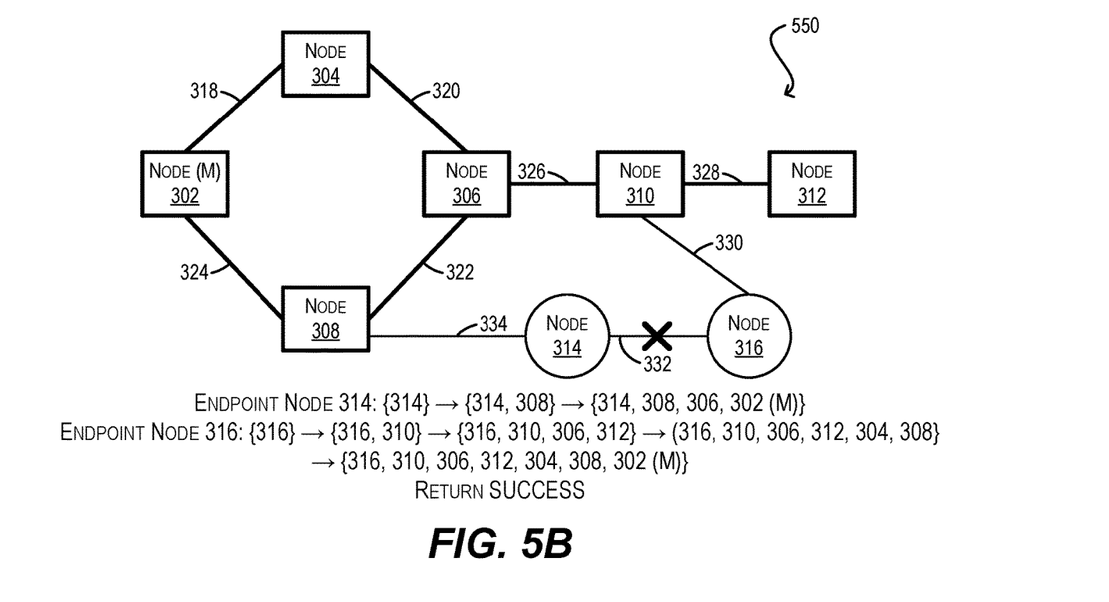

To further clarify the operation of the validation algorithm of FIG. 4, FIGS. 5A and 5B depict exemplary scenarios 500 and 550 where the algorithm is used to validate the removal of certain links in topology 300 of FIG. 3. For instance, in FIG. 5A, the link to be removed is link 326 (between high-end nodes 306 and 310). In this scenario, the algorithm first processes endpoint node 306 and a node set is created that includes node 306 as its initial member (per block 408 of FIG. 4). The algorithm then runs through loop 410, and the node set for endpoint node 306 grows to {306, 304, 308} in the first iteration, and {306, 304, 308, 302} in the second iteration.

Since node 302 is the master node, the algorithm determines that its processing can continue (per blocks 414 and 420), and moves on to creating a node set for second endpoint node 310 (that includes node 310 as its initial member). The algorithm then runs through loop 410 for endpoint node 310, and the node set for endpoint node 310 grows to {310, 312} in the first iteration (note that directly connected node 316 is not added to the node set since node 310 is a high-end node and node 316 is a low-end node). At this point, there are no further nodes in the node set to be processed, and the node set does not include master node 302. Accordingly, the algorithm concludes that there is no viable path between endpoint node 310 and master node 302 and returns a "FAIL" result (thereby blocking the removal of link 326).

Turning now to FIG. 5B, the link to be removed in this scenario is link 332 (between low-end nodes 314 and 316). Here, the algorithm first processes endpoint node 314 and a node set is created that includes node 314 as its initial member (per block 408). The algorithm then runs through loop 410, and the node set for endpoint node 314 grows to {314, 308} in the first iteration, and {314, 308, 306, 302} in the second iteration.

Since node 302 is the master node, the algorithm determines that its processing can continue (per blocks 414 and 420), and moves on to creating a node set for second endpoint node 316 (that includes node 316 as its initial member). The algorithm then runs through loop 410 for endpoint node 316, and the node set for endpoint node 316 grows to {316, 310} in the first iteration, {316, 310, 306, 312} in the second iteration, {316, 310, 306, 312, 304, 308} in the third iteration, and {316, 310, 306, 312, 304, 308, 302} in the fourth iteration. Since node 302 is the master node and all endpoint nodes are now processed, the algorithm concludes that there are viable paths between each endpoint node 310, 316 and master node 302 and returns a "SUCCESS" result (thereby allowing the removal of link 332).

Figure 6:
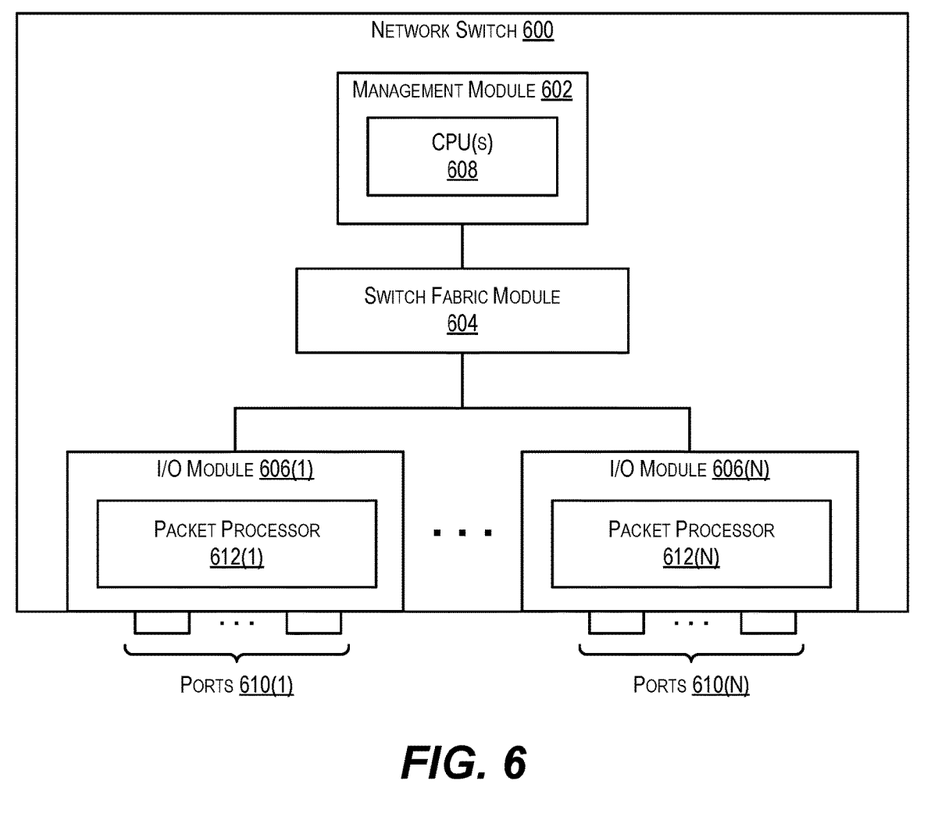
FIG. 6 depicts a network switch according to an embodiment.

FIG. 6 depicts a network switch 600 according to an embodiment. Network switch 600 can be used to implement any of the nodes/stackable switches described in the foregoing disclosure, such as stackable switch 100 of FIG. 1A.

As shown, network switch 600 includes a management module 602, a switch fabric module 604, and a number of I/O modules 606(1)-606(N). Management module 602 represents the control plane of network switch 600 and thus includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 604 and I/O modules 606(1)-606(N) collectively represent the data, or forwarding, plane of network switch 600. Switch fabric module 604 is configured to interconnect the various other modules of network switch 600. Each I/O module 606(1)-606(N) can include one or more input/output ports 610(1)-610(N) that are used by network switch 600 to send and receive data packets. As noted with respect to FIGS. 1A and 1B, ports 610(1)-610(N) can comprise data ports for communicating with hosts/other network devices, as well as stacking ports for communicating with other switch units in the same stacking system. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing data packets.

It should be appreciated that network switch 600 is illustrative and not intended to limit embodiments of the present invention. Many other configurations having more or fewer components than switch 600 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a device, a user command to remove a link from a topology comprising a plurality of nodes, the plurality of nodes including one or more nodes of a first type and one or more nodes of a second type;
   validating, by the device, whether removal of the link from the topology would cause one or more nodes in the plurality of nodes to become unreachable by a master node of the first type, or whether removal of the link would cause data traffic between two nodes of the first type to pass through a node of the second type;
   if removal of the link would cause one or more nodes in the plurality of nodes to become unreachable by the master node or cause data traffic between two nodes of the first type to pass through a node of the second type, rejecting, by the device, the user command to remove the link from the topology; and
   if removal of the link would not cause one or more nodes in the plurality of nodes to become unreachable by the master node and would not cause data traffic between two nodes of the first type to pass through a node of the second type, accepting, by the device, the user command to remove the link from the topology.

2. The method of claim 1 wherein the topology is a mesh topology.

3. The method of claim 1 wherein the one or more nodes of the first type are more capable than the one or more nodes of the second type.

4. The method of claim 3 wherein the one or more nodes of the first type support greater port bandwidth, a larger number of ports, or a higher level of security clearance than the one or more nodes of the second type.

5. The method of claim 1 wherein the validating comprises:
   removing the link from a representation of the topology; and
   for each endpoint node located at an endpoint of the link, creating a node set that includes the endpoint node.

6. The method of claim 5 wherein the validating further comprises, for the endpoint node:
   adding, to the node set, other nodes in the plurality of nodes that are directly linked to the endpoint node in the representation of the topology; and
   subsequently to the adding, checking whether the node set includes the master node.

7. The method of claim 6 wherein if the endpoint node is of the second type, the adding comprises adding directly linked nodes that are of the first type or the second type, and
   wherein if the endpoint node is of the first type, the adding comprises adding directly linked nodes that are of the first type, without adding any directly linked nodes that are of the second type.

8. The method of claim 6 wherein the validating further comprises:
   if the node set does not include the master node, repeating the adding and the checking for additional nodes in the node set;
   else if the node set includes the master node, returning a first result.

9. The method of claim 8 wherein the validating further comprises:
   if every node in the node set has been processed and the first result has not been returned, returning a second result.

10. The method of claim 9 wherein the user command is rejected if the second result is returned for any endpoint node of the link.

11. The method of claim 1 wherein the device is the master node.

12. The method of claim 1 wherein the topology represents a stacking system, and wherein each node in the plurality of nodes corresponds to a stackable switch in the stacking system.

13. The method of claim 12 wherein the user command specifies a stacking port or a stacking trunk of a node in the plurality of nodes, and
   wherein the link is identified based on the stacking port or the stacking trunk.

14. A non-transitory computer readable medium having stored thereon program code executable by a processor, the program code comprising code that causes the processor to:

receive a user command to remove a link from a topology comprising a plurality of nodes, the plurality of nodes including one or more nodes of a first type and one or more nodes of a second type;

validate whether removal of the link from the topology would cause one or more nodes in the plurality of nodes to become unreachable by a master node of the first type, or whether removal of the link would cause data traffic between two nodes of the first type to pass through a node of the second type;

if removal of the link would cause one or more nodes in the plurality of nodes to become unreachable by the master node or cause data traffic between two nodes of the first type to pass through a node of the second type, reject the user command to remove the link from the topology; and if removal of the link would not cause one or more nodes in the plurality of nodes to become unreachable by the master node and would not cause data traffic between two nodes of the first type to pass through a node of the second type, accept the user command to remove the link from the topology.

15. The non-transitory computer readable medium of claim 14 wherein the one or more nodes of the first type are more capable than the one or more nodes of the second type.

16. A device comprising:

a processor; and a non-transitory computer readable medium having stored thereon program code which, when executed by the processor, causes the processor to:

receive a user command to remove a link from a topology comprising a plurality of nodes, the plurality of nodes including one or more nodes of a first type and one or more nodes of a second type;

validate whether removal of the link from the topology would cause one or more nodes in the plurality of nodes to become unreachable by a master node of the first type, or whether removal of the link would cause data traffic between two nodes of the first type to pass through a node of the second type;

if removal of the link would cause one or more nodes in the plurality of nodes to become unreachable by the master node or cause data traffic between two nodes of the first type to pass through a node of the second type, reject the user command to remove the link from the topology; and if removal of the link would not cause one or more nodes in the plurality of nodes to become unreachable by the master node and would not cause data traffic between two nodes of the first type to pass through a node of the second type, accept the user command to remove the link from the topology.

17. The device of claim 16 wherein the one or more nodes of the first type are more capable than the one or more nodes of the second type.

* * * * *